United States Patent
Hermoni et al.

(10) Patent No.: US 10,936,721 B1
(45) Date of Patent: Mar. 2, 2021

(54) SYSTEM, METHOD, AND COMPUTER PROGRAM FOR SPLITTING AND DISTRIBUTING A PRIVILEGED SOFTWARE COMPONENT INTO DEPENDENT COMPONENTS IN ORDER TO DELIVER BETTER SECURITY

(71) Applicant: Amdocs Development Limited, Limassol (CY)

(72) Inventors: Ofer Hermoni, Tenafly, NJ (US); Daniel Sela, Petah Tikva (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/287,922

(22) Filed: Feb. 27, 2019

Related U.S. Application Data

(60) Provisional application No. 62/637,337, filed on Mar. 1, 2018.

(51) Int. Cl.
  *G06F 21/57* (2013.01)
  *G06F 21/45* (2013.01)

(52) U.S. Cl.
  CPC .............. *G06F 21/57* (2013.01); *G06F 21/45* (2013.01); *G06F 2221/034* (2013.01); *G06F 2221/2101* (2013.01); *H04L 2209/38* (2013.01)

(58) Field of Classification Search
  CPC .. G06F 21/57; G06F 21/45; G06F 2221/2101; G06F 2221/034; H04L 2209/38
  See application file for complete search history.

(56) References Cited

U.S. PATENT DOCUMENTS

| 7,404,207 | B2 | 7/2008 | Perry | |
|---|---|---|---|---|
| 7,904,720 | B2 | 3/2011 | Smetters et al. | |
| 8,448,216 | B2 | 5/2013 | Liu et al. | |
| 9,723,064 | B1 * | 8/2017 | McKelvie | H04L 67/1095 |
| 10,063,572 | B2 * | 8/2018 | Milazzo | G06F 21/564 |
| 2017/0279818 | A1 * | 9/2017 | Milazzo | H04L 63/145 |
| 2017/0344988 | A1 * | 11/2017 | Cusden | G06F 21/00 |
| 2017/0366348 | A1 * | 12/2017 | Weimer | H04L 9/3236 |
| 2018/0189100 | A1 * | 7/2018 | Nemoto | G06F 9/4831 |
| 2018/0337771 | A1 * | 11/2018 | Baker | H04L 9/3236 |
| 2019/0004789 | A1 * | 1/2019 | Mills | H04L 67/104 |

(Continued)

FOREIGN PATENT DOCUMENTS

EP  2285061 A1  2/2011

OTHER PUBLICATIONS

The Golem Project; Nov. 2016 (Year: 2016).*

*Primary Examiner* — James R Turchen
(74) *Attorney, Agent, or Firm* — Zilka-Kotab, P.C.

(57) ABSTRACT

As described herein, a system, method, and computer program are provided for splitting and distributing a privileged software system into dependent components in order to deliver better security. In use, a privilege system is separated into n components of at least three components, wherein each of the n components runs on a separate machine, and a number up to t components may be controlled in an adversarial manner without compromising the privilege system, t components being at least two components and less than the n components. A power of a privilege is distributed among the n components. Additionally, one or more actions are performed within the privileged system.

12 Claims, 11 Drawing Sheets

(56) References Cited

U.S. PATENT DOCUMENTS

| | | | |
|---|---|---|---|
| 2019/0036778 A1* | 1/2019 | Bathen | H04L 41/0893 |
| 2019/0058577 A1* | 2/2019 | Bowman | H04L 9/06 |
| 2019/0058709 A1* | 2/2019 | Kempf | H04L 9/3226 |
| 2019/0097807 A1* | 3/2019 | Mahanta | H04L 63/10 |
| 2019/0149418 A1* | 5/2019 | Bertsche | G06F 9/445 |
| | | | 707/625 |
| 2019/0165949 A1* | 5/2019 | Ramos | H04L 9/3247 |
| 2019/0182257 A1* | 6/2019 | Lee | G06Q 10/06315 |
| 2019/0190896 A1* | 6/2019 | Singh | G06F 21/62 |
| 2019/0199531 A1* | 6/2019 | Staples | H04L 9/0891 |
| 2019/0205884 A1* | 7/2019 | Batra | G06Q 20/3827 |
| 2019/0207748 A1* | 7/2019 | Courtney | H04L 9/0637 |
| 2019/0230089 A1* | 7/2019 | Xu | G06F 21/604 |
| 2019/0268284 A1* | 8/2019 | Karame | H04L 9/3236 |
| 2019/0268407 A1* | 8/2019 | Zeng | G06F 8/656 |

* cited by examiner

SYSTEM, METHOD, AND COMPUTER PROGRAM FOR SPLITTING AND DISTRIBUTING A PRIVILEGED SOFTWARE COMPONENT INTO DEPENDENT COMPONENTS IN ORDER TO DELIVER BETTER SECURITY

RELATED APPLICATIONS

The present application claims priority to U.S. Provisional Application No. 62/637,337, entitled "SYSTEM, METHOD, AND COMPUTER PROGRAM FOR SPLITTING AND DISTRIBUTING A PRIVILEGED SOFTWARE COMPONENT INTO DEPENDENT COMPONENTS IN ORDER TO DELIVER BETTER SECURITY," filed on Mar. 1, 2018, the entire contents of which is incorporated herein by reference.

FIELD OF THE INVENTION

The present invention relates to privileged software systems, and more particularly to splitting and distributing a privileged software component into dependent components in order to deliver better security.

BACKGROUND

Many management and orchestration solutions are designed to manage a lifecycle of services based on policies. In such solutions, the privileged system (i.e., orchestrator, domain controller, anti-virus engine, etc.) is the single point of failure in terms of quality of service (QoS), integrity, and security. In case of compromise, the entire solutions, namely the system and all the services, could be extensively affected or even shut down.

There is thus a need for addressing these and/or other issues associated with the prior art.

SUMMARY

As described herein, a system, method, and computer program are provided for splitting and distributing a privileged software component into dependent components in order to deliver better security. In use, a privilege system is separated into n components of at least three components, wherein each of the n components runs on a separate machine, and a number up to t components may be controlled in an adversarial manner without compromising the privilege system, t components being at least two components and less than the n components. A power of a privilege is distributed among the n components. Additionally, one or more actions are performed within the privileged system.

DETAILED DESCRIPTION

Figure 1:
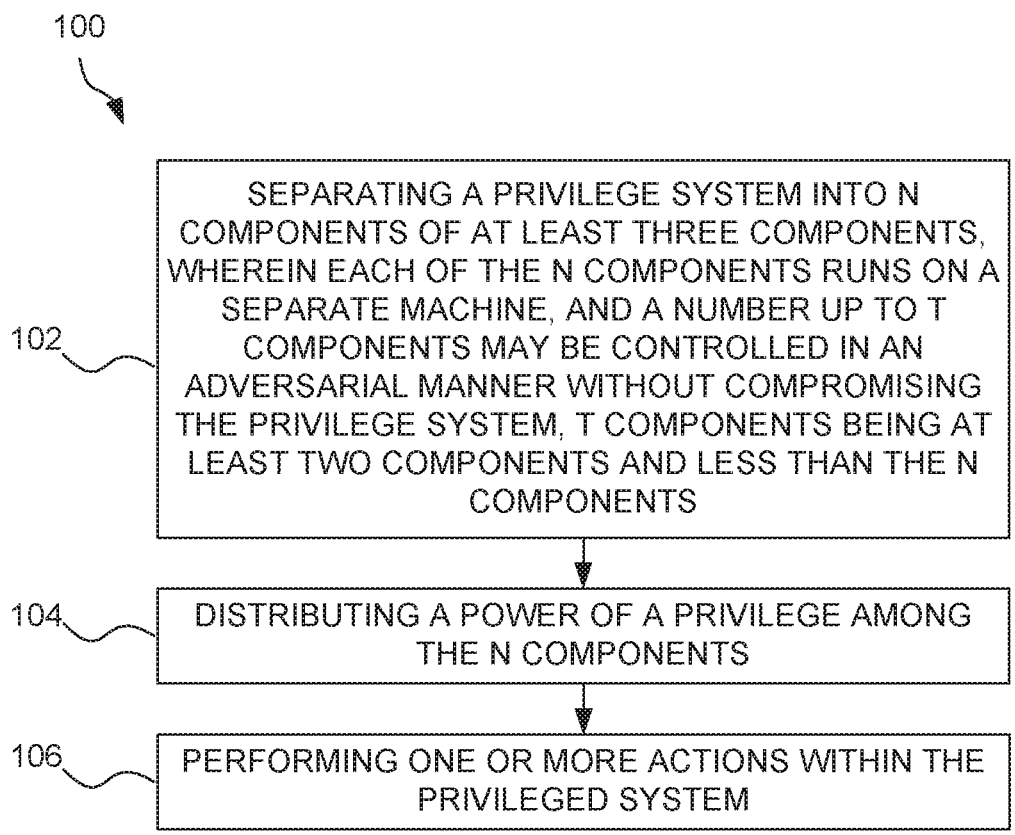
FIG. 1 illustrates a method for splitting and distributing a privileged software component into dependent components, in accordance with one embodiment.

FIG. 1 illustrates a method for splitting and distributing a privileged software component into dependent components, in accordance with one embodiment.

As shown, in operation 102, a privilege system is separated into n components of at least three components, wherein each of the n components runs on a separate machine, and a number up to t components may be controlled in an adversarial manner without compromising the privilege system, t components being at least two components and less than the n components. In the context of the present description, a privilege system includes any computer system where authority to perform functions may be delegated to computer components. Additionally, the at least three components may include any system resource.

Additionally, a power of a privilege is distributed among the n components. See operation 104. In the context of the present description, a power of privilege includes an authority to perform one or more functions. For example, one or more functions may include defining a policy, signing the policy, collecting relevant data to the policy, validating the policy, decrypting credentials, modifying the policy, start or stop actions associated with the policy, create and/or remove new system resources or nodes, create and/or remove users or groups of users, etc.

Further, one or more actions are preformed within the privileged system. See operation 106. For example, the one or more actions may be performed on a target asset, the one or more actions including at least one of spawning a new instance, removing an instance, or restarting a service.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
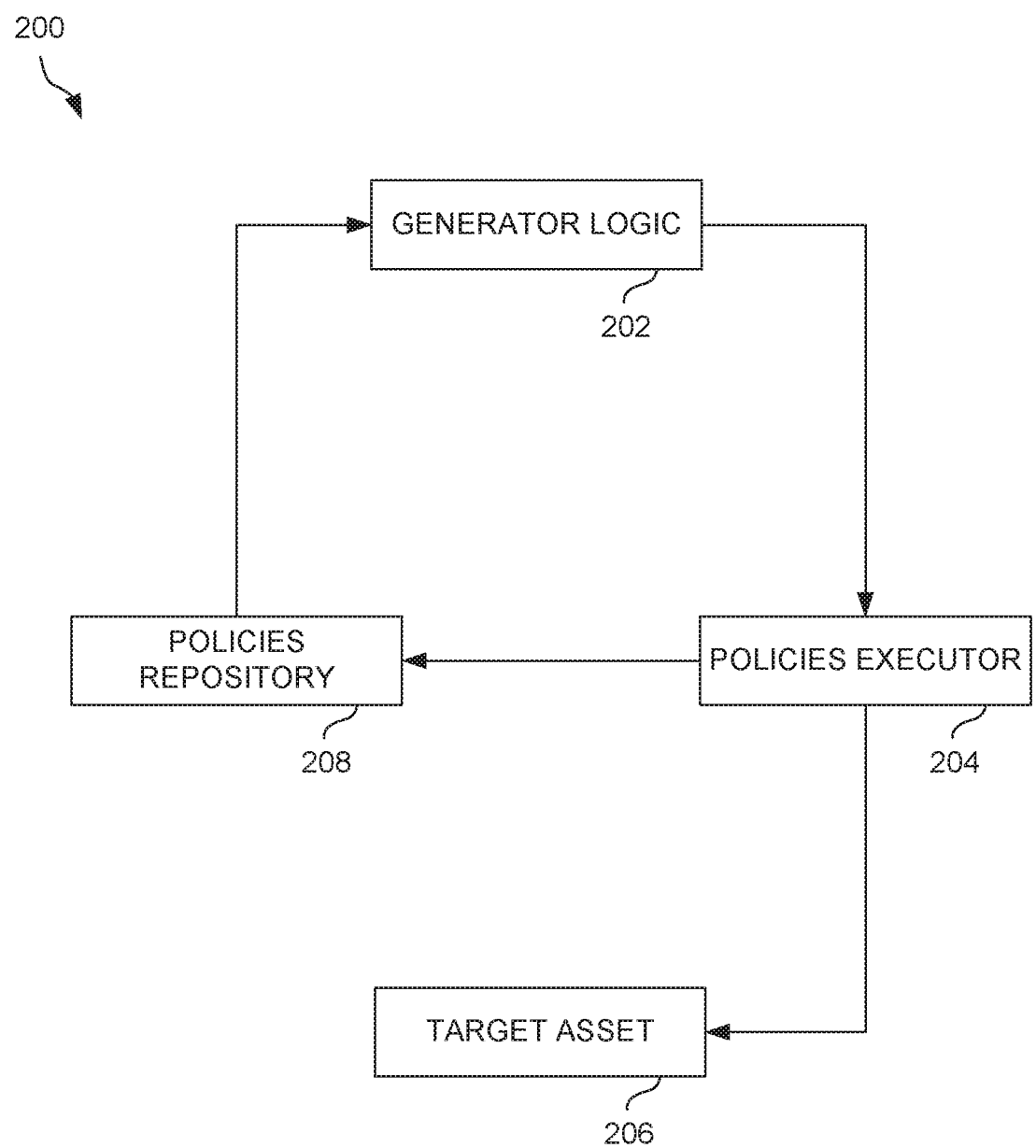
FIG. 2 illustrates a system flow diagram resulting from splitting and distributing a privileged software component into dependent components in order to deliver better security, in accordance with one embodiment.

FIG. 2 illustrates a system flow diagram resulting from splitting and distributing a privileged software component into dependent components in order to deliver better security, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below. In one embodiment, FIG. 2 may illustrate a system flow diagram where n=3 and t=2.

As shown, a policies repository 208 may be used as a repository for the policy rules. Generator logic 202 may be used to gather data and check the policy compliancy (e.g., detect triggered policy rules, etc.). Additionally, a policies executor 204 may execute the policy. In this manner, the policies repository 208 may provide policy rules to the generator logic 202 which may then determine whether the policy rules are triggered, and when applicable, the generator logic 202 may provide the policy rules to the policies executor 204 for execution.

The policies repository 208 may include a policy bank where each policy may be signed and/or otherwise validated. Additionally, each validated policy may yield a key to be used together with an orchestrator's key to unlock the privileged credentials stored at the policies executor 204. The generator logic 202 may gather data and check policy compliance (such as the policies originating from the policies repository 208). For example, perform an action "X" if the CPU usage is over 80% for more than five seconds. The policies executor 204 may store the privileged credentials to perform network actions, and which may be encrypted by a key stored at the policies repository 208. The policies executor 204 may confirm the policy's signature with the policies repository 208 before executing a command or action of the policy.

In one embodiment, the policies executor 204 may be in contact with a target asset 206 to execute an action. For example, an action may include spawning a new instance, removing an instance, restarting a service, etc.

In one embodiment, the system 200 may include a credentials vault which may be used to control credentials storage. For example, the credentials vault may be used to change credentials from time to time to promote better security and comply with security policy, etc. In other embodiments, the system 200 may include an audit module, a log module, and/or a reports generator, etc.

In a further embodiment, the policies repository 208 may use blockchain technology to store and audit the policy, providing further security against tampering of rules (alteration), fault-tolerance, and continuity (due to distributed storage) advantages.

Additionally, example components may include generator logic 202 that matches a given policy with collected data and decides on actions; a policies executor 204 that stores encrypted privileged credentials, and once decrypted can be used to execute actions; and a policies repository 208 that stores policy rules and decryption key(s) for the policies executor's 204 credentials.

In one embodiment, the generator logic 202 may generate commands, i.e., to ask for changes. Additionally, the system 200 may limit any other component from generating commands. The policies executor 204 may include encrypted credentials, allowing it to make changes. In one embodiment, the policies executor 204 may make changes when asked from the generator logic 202 and/or according to rules (originating from the policies repository 208). The policies repository 208 may include decryption keys for the policies executor's 204 credentials. Further, the system 204 may limit any other component from having encrypted credentials (other than the policies executor 204), and/or the system 204 may limit any other component from having decryption keys (other than the policies repository 208).

The policies repository 208 may provide the generator logic 202 with policy rules. The generator logic 202 may be provided with data and/or may collect data and match provided rules with other relevant data (e.g., in a Network Function Virtualization [NFV] environment, data coming from the network and from the applications, such as Virtual Network Functions [VNFs]). In one embodiment, monitoring a system (such as an NFV network) may include taking an appropriate action. For example, changes in KPIs in an NFV or any other system may cause the monitoring system to take action. Additionally, monitoring may include a cloud computing system, or any system that can be managed in an agile manner.

The generator logic 202 may send a command to the policies executor 204. The command includes a trigger policy rule. The policies executor 204 may validate the trigger policy rule with the policies repository 208. The policies repository 208 may provide the policies executor 204 with a decryption key. The policies executor 204 may decrypt stored privileged credentials using the decryption key. In one embodiment, when the command chain is validated, the policies executor 204 may execute network actions.

To gain privileged access, an attacker may be required to gain control of at least n machines (such as two out of the three components discussed above, such as the generator logic 202, the policies executor 204, and/or the policies repository 208), where each machine can be hardened and analyzed for normal and abnormal behavior and expose a well-defined API, which can be monitored. In other words, a system may remain safe if the adversary controls up to t components, where t<n. For example, for a system where n=3, the system may remain safe if the adversary controls no more than 2 components.

Figure 3:
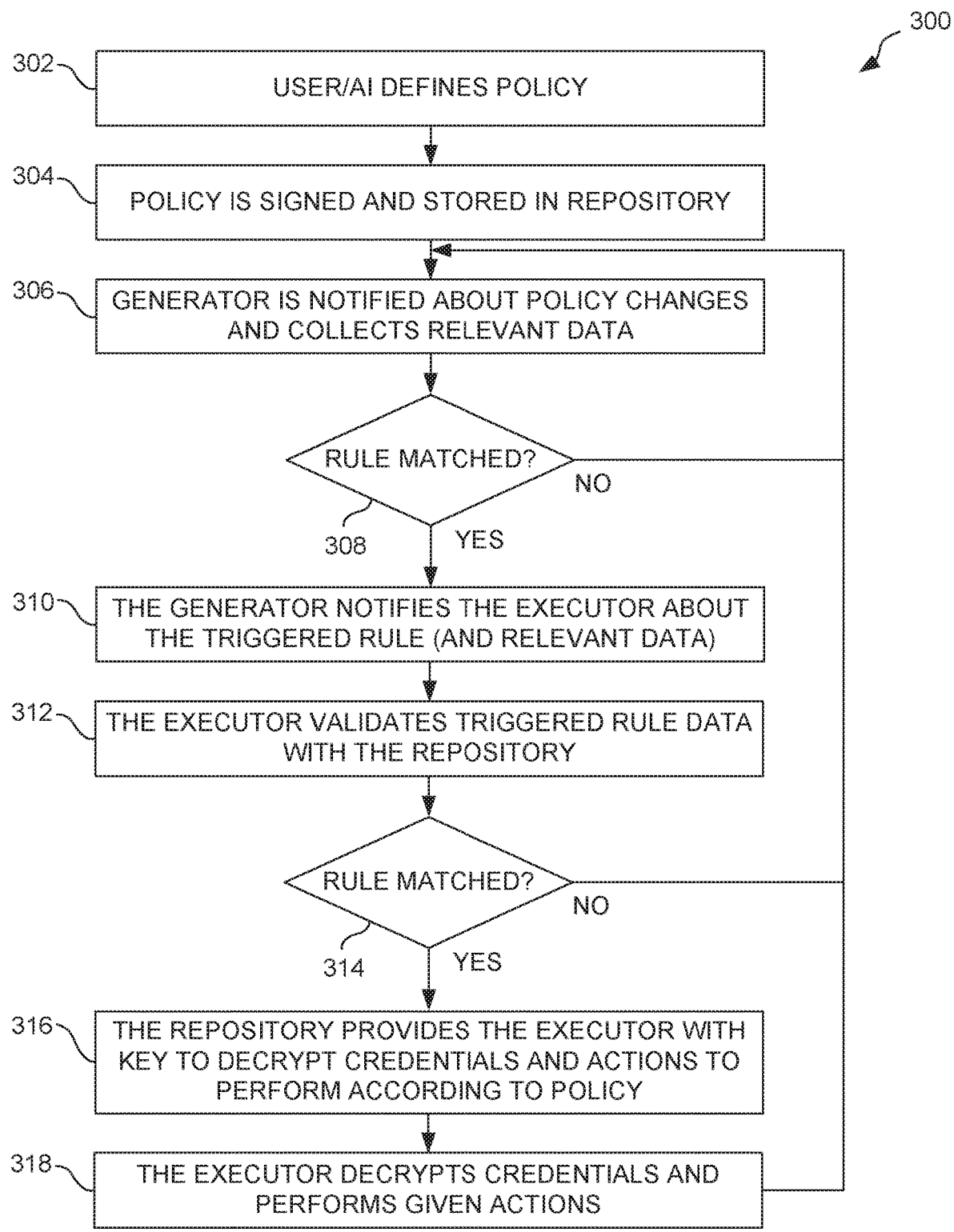
FIG. 3 shows a flow diagram resulting from splitting and distributing a privileged software component into dependent components in order to deliver better security, in accordance with one embodiment.

FIG. 3 shows a flow diagram resulting from splitting and distributing a privileged software component into dependent components in order to deliver better security, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, per operation 302, a user or an artificial intelligence (AI) system defines a policy. The policy is signed and stored in a repository (such as the policies repository 208). See operation 304. The generator (such as the generator logic 202) is notified about policy changes and collects relevant data. See operation 306. In one embodiment, relevant data may include a policy rule (such as if CPU usage is over 80% for more than 5 seconds). In this manner, the generator logic may gather CPU usage data and check whether the policy rule was satisfied.

It is determined whether the rule matches (i.e., is satisfied per the policy rule). See decision 308. If the rule of the policy does not match, the method 300 returns to operation 306. If the rule does match, then the method 300 continues on to operation 310 where the generator logic 202 notifies the policies executor 204 about the triggered rule, as well as any relevant data collected by the generator logic 202. The policies executor 204 may validate the triggered rule data with the policies repository 208. See operation 312.

It is determined again whether the rule matches. See decision 314. If the rule of the policy does not match, the method 300 returns to operation 306. If the rule does match, then the method 300 continues on to operation 316 where the policies repository 208 provides the policies executor 204 with a key to decrypt credentials, as well as actions to perform according to the policy. As such, the policies executor 204 decrypts the credentials and then performs the given actions.

Figure 4:
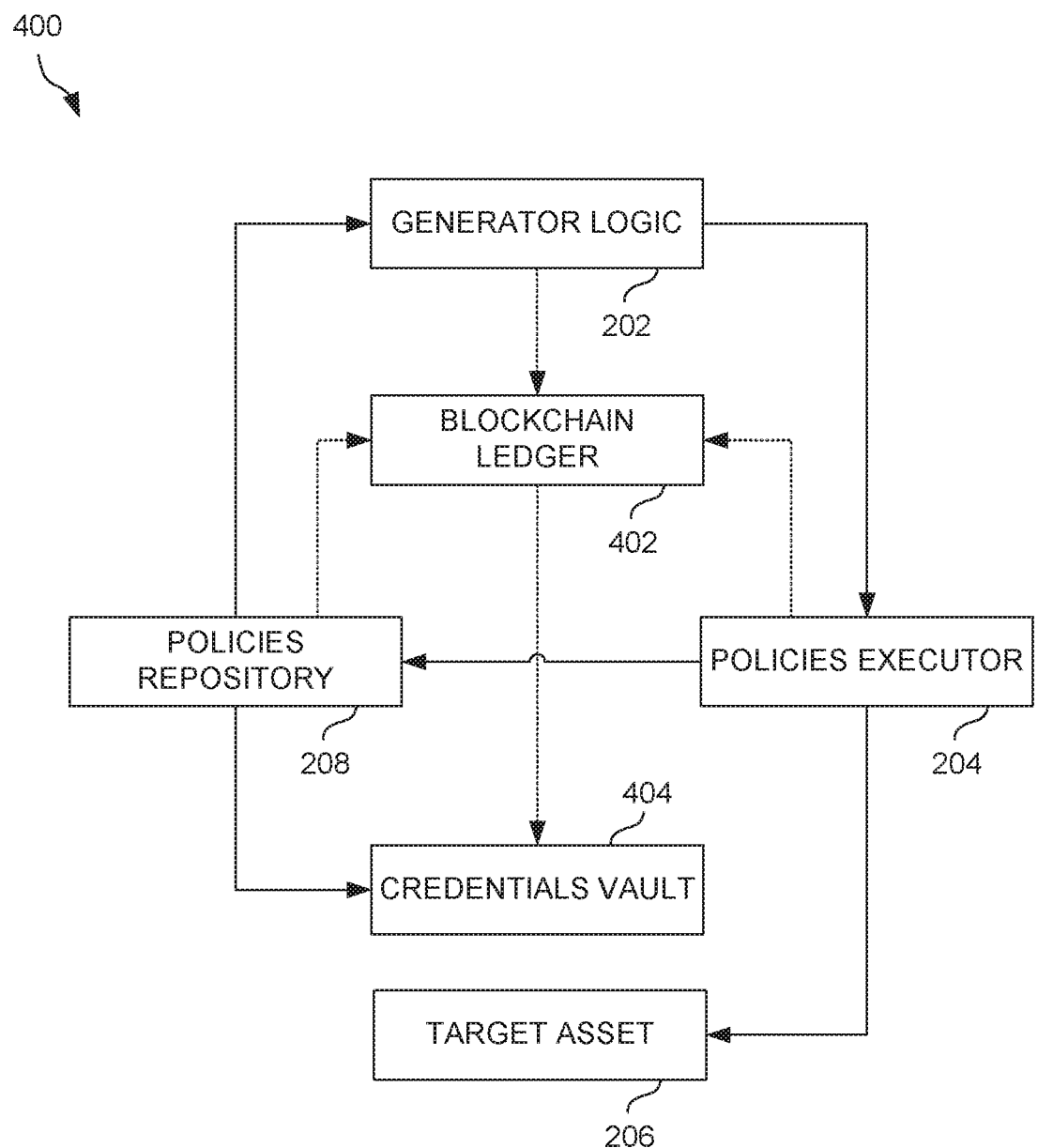
FIG. 4 shows a system flow diagram resulting from splitting and distributing a privileged software component into dependent components in order to deliver better security, in accordance with one embodiment.

FIG. 4 shows a system flow diagram resulting from splitting and distributing a privileged software component into dependent components in order to deliver better security, in accordance with one embodiment. As an option, the flow diagram may be implemented in the context of the details of the previous figures and/or any subsequent figure(s). Of course, however, the flow diagram may be implemented in the context of any desired environment. Further, the aforementioned definitions may equally apply to the description below.

In operation, a system 400 may be split into at least three components (and which may occur on different physical machines and across different logical network segments). The separation of the components, physical machines, networks, etc. may allow for better definition of the functionality of each component, its APIs and behavior, which may enable better security for each component, smaller attack surface per component, and eventually greater effort required by malicious actor to gain control over privileged credentials/components.

As shown, the system 400 may include a blockchain ledger 402. The blockchain ledger 402 may be in communication with any of the generator logic 202, the policies executor 204, and/or the policies repository 208. In one embodiment, the blockchain ledger 402 may be used to encrypt and/or otherwise secure data originating from a system component. For example, policy rules stored in 208 may be securely transmitted to the generator logic 202, which may then verify, using the blockchain ledger 402, the integrity of the policy rules sent. In like manner, the policies executor 204 may verify the policy rules sent from the generator logic 202 via the blockchain ledger to ensure the integrity of what was sent.

Additionally, the system 400 may include a credentials vault 404, which may be used to control credentials storage. The credentials vault 404 may be used to change credentials from time to time to promote better security and comply with security policy, etc. Additionally, the credentials vault 404 may be further in communication with the blockchain ledger 402 to ensure an integrity of credentials used of the system 400.

Figure 5:
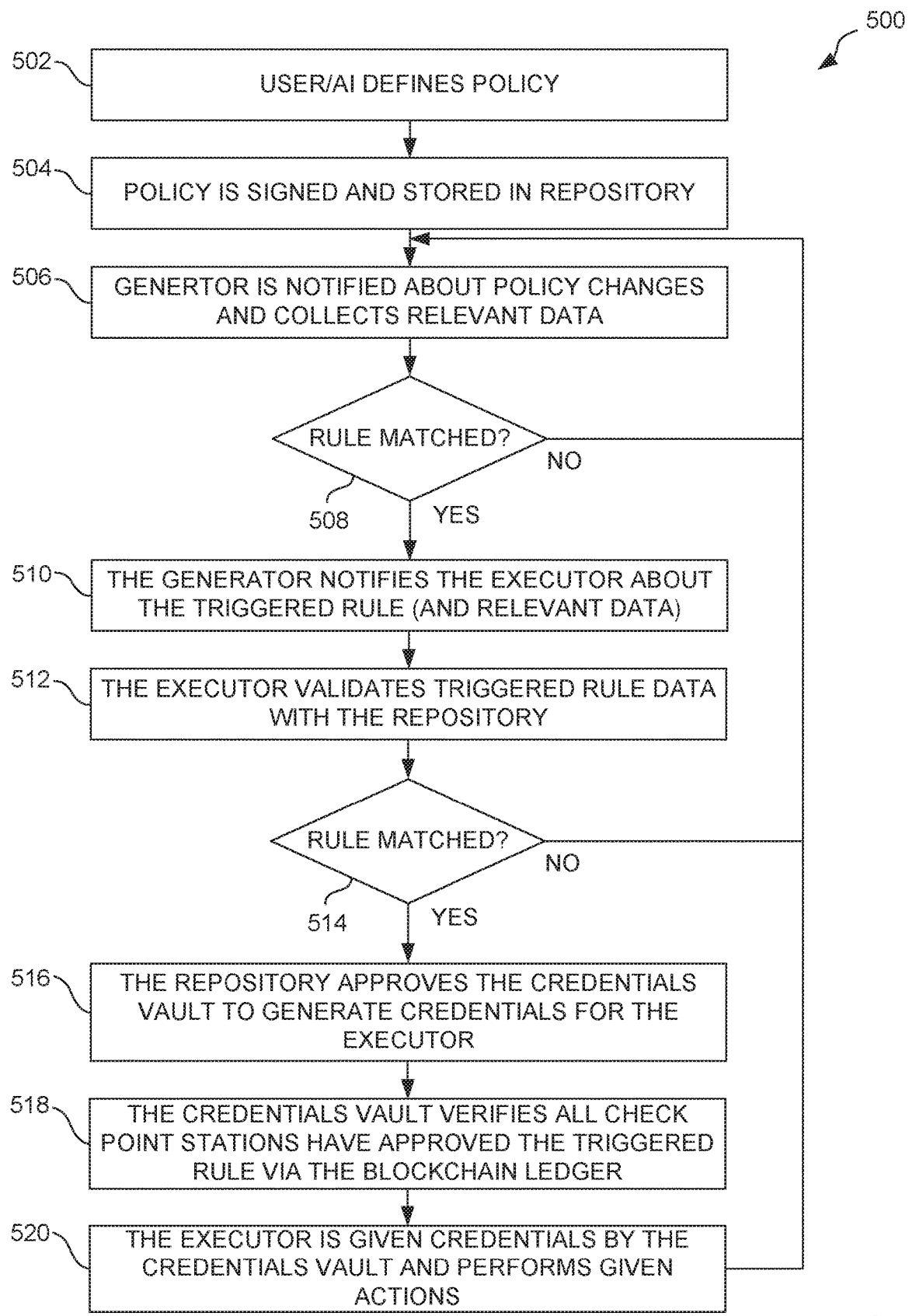
FIG. 5 shows a flow diagram resulting from splitting and distributing a privileged software component into dependent components in order to deliver better security, in accordance with one embodiment.

FIG. 5 shows a flow diagram resulting from splitting and distributing a privileged software component into dependent components in order to deliver better security, in accordance with one embodiment. As an option, the flow diagram may be implemented in the context of the details of the previous figures and/or any subsequent figure(s). Of course, however, the flow diagram may be implemented in the context of any desired environment. Further, the aforementioned definitions may equally apply to the description below.

As shown, per operation 502, a user or an artificial intelligence (AI) system defines a policy. The policy is signed and stored in a repository (such as the policies repository 208). See operation 504. The generator (such as the generator logic 202) is notified about policy changes and collects relevant data. See operation 506.

It is determined whether the rule matches. See decision 508. If the rule of the policy does not match, the method 500 returns to operation 506. If the rule does match, then the method 500 continues on to operation 510 where the generator logic 202 notifies the policies executor 204 about the triggered rule, as well as any relevant data collected by the generator logic 202. The policies executor 204 may validate the triggered rule data with the policies repository 208. See operation 512.

It is determined again whether the rule matches. See decision 514. If the rule of the policy does not match, the method 500 returns to operation 506. If the rule does match, then the method 500 continues on to operation 516 where the policies repository 208 approves the credentials vault (such as the credentials vault 404) to generate credentials for the policies executor 204. The credentials vault 404 may verify that all check point stations have approved the triggered rule via the blockchain ledger 402. See operation 518. Further, the policies executor 204 may be given credentials by the credentials vault 404 and perform any given actions. See operation 520.

Figure 6:
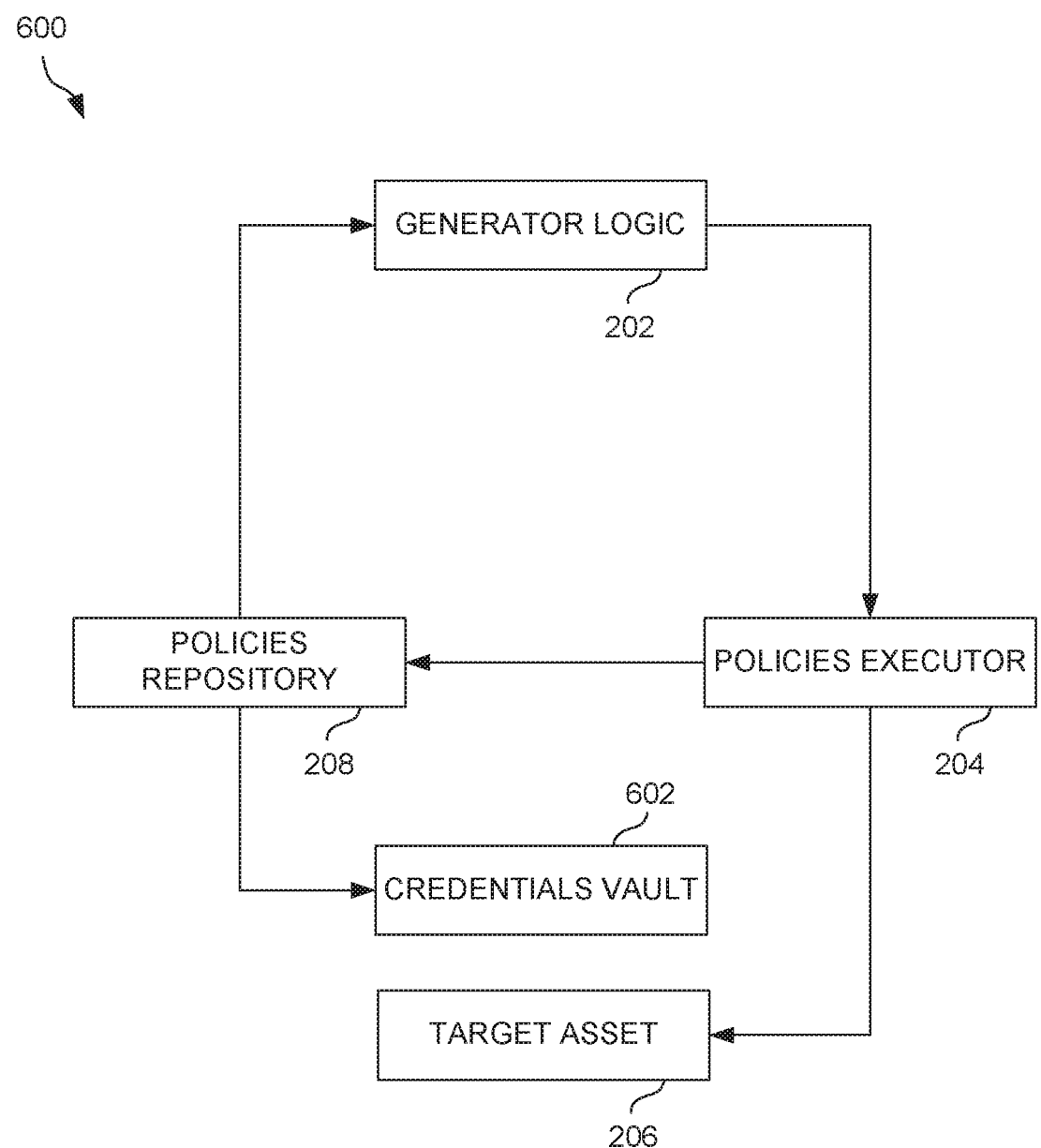
FIG. 6 shows a system flow diagram resulting from splitting and distributing a privileged software component into dependent components in order to deliver better security, in accordance with one embodiment.

FIG. 6 shows a system flow diagram resulting from splitting and distributing a privileged software component into dependent components in order to deliver better security, in accordance with one embodiment. As an option, the flow diagram may be implemented in the context of the details of the previous figures and/or any subsequent figure(s). Of course, however, the flow diagram may be implemented in the context of any desired environment. Further, the aforementioned definitions may equally apply to the description below.

As shown, system 600 may include a credentials vault 602. In one embodiment, the credentials vault 602 may correspond with the credentials vault 404. Additionally, the system 600 may function, in one embodiment, without a blockchain ledger. Further, the generator logic 202, the policies executor 204, the target asset 206, and the policies repository 208, may function in a manner consistent as herein described.

Figure 7:
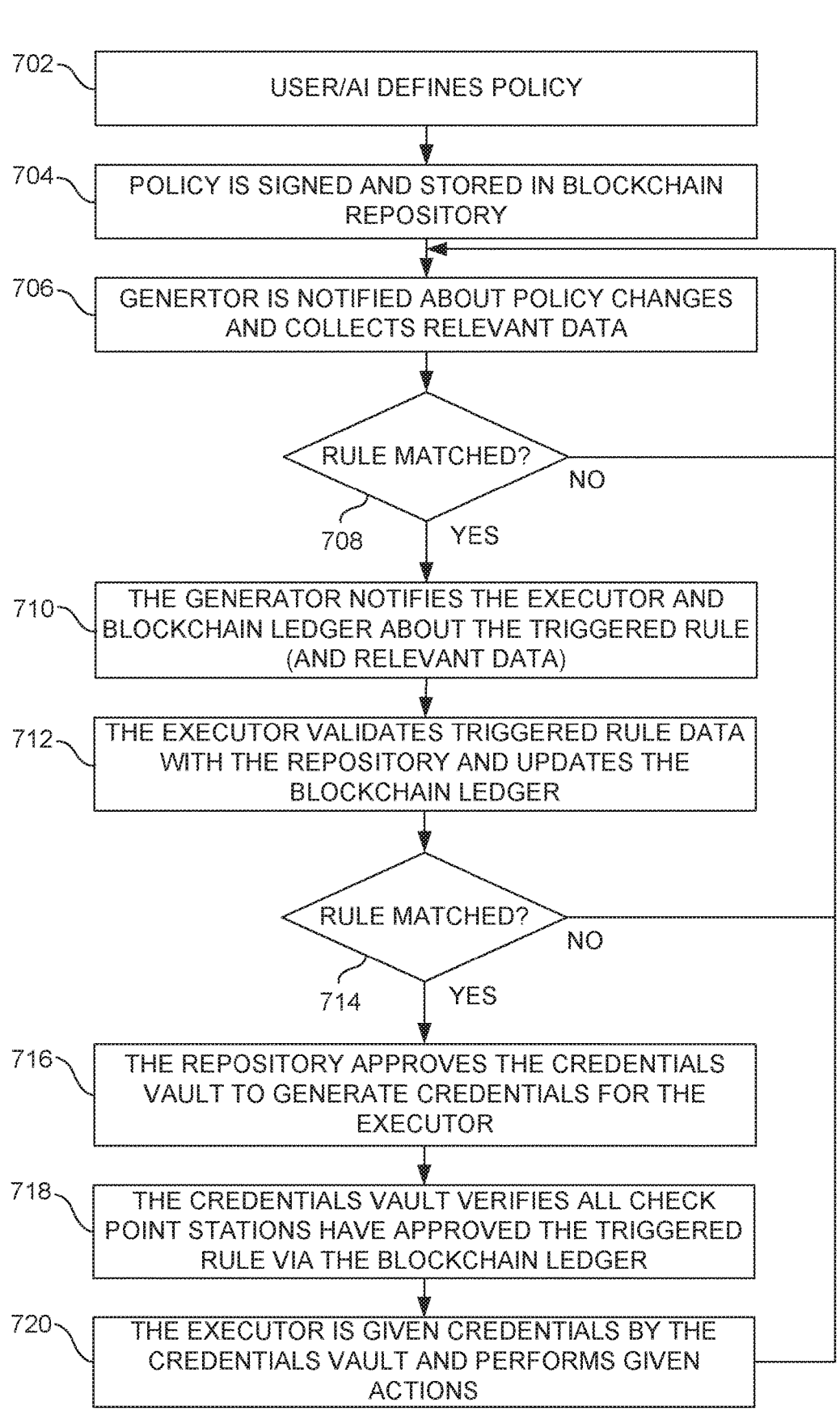
FIG. 7 shows a flow diagram resulting from splitting and distributing a privileged software component into dependent components in order to deliver better security, in accordance with one embodiment.

FIG. 7 shows a flow diagram resulting from splitting and distributing a privileged software component into dependent components in order to deliver better security, in accordance with one embodiment. As an option, the flow diagram may be implemented in the context of the details of the previous figures and/or any subsequent figure(s). Of course, however, the flow diagram may be implemented in the context of any desired environment. Further, the aforementioned definitions may equally apply to the description below.

As shown, per operation 702, a user or an artificial intelligence (AI) system defines a policy. The policy is signed and stored in a blockchain repository (such as the blockchain ledger 402). See operation 704. The generator (such as the generator logic 202) is notified about policy changes and collects relevant data. See operation 706.

It is determined whether the rule matches. See decision 708. If the rule of the policy does not match, the method 700 returns to operation 706. If the rule does match, then the method 700 continues on to operation 710 where the generator logic 202 notifies the policies executor 204 and the blockchain ledger 402 about the triggered rule, as well as any relevant data collected. The policies executor 204 may validate the triggered rule data with the policies repository 208 and update the blockchain ledger 402. See operation 712.

It is determined again whether the rule matches. See decision 714. If the rule of the policy does not match, the method 700 returns to operation 706. If the rule does match, then the method 700 continues on to operation 716 where the policies repository 208 approves the credentials vault (such as the credentials vault 404) to generate credentials for the policies executor 204. The credentials vault 404 may verify that all check point stations have approved the triggered rule via the blockchain ledger 402. See operation 718. Further, the policies executor 204 may be given credentials by the credentials vault 404 and perform any given actions. See operation 720.

Figure 8:
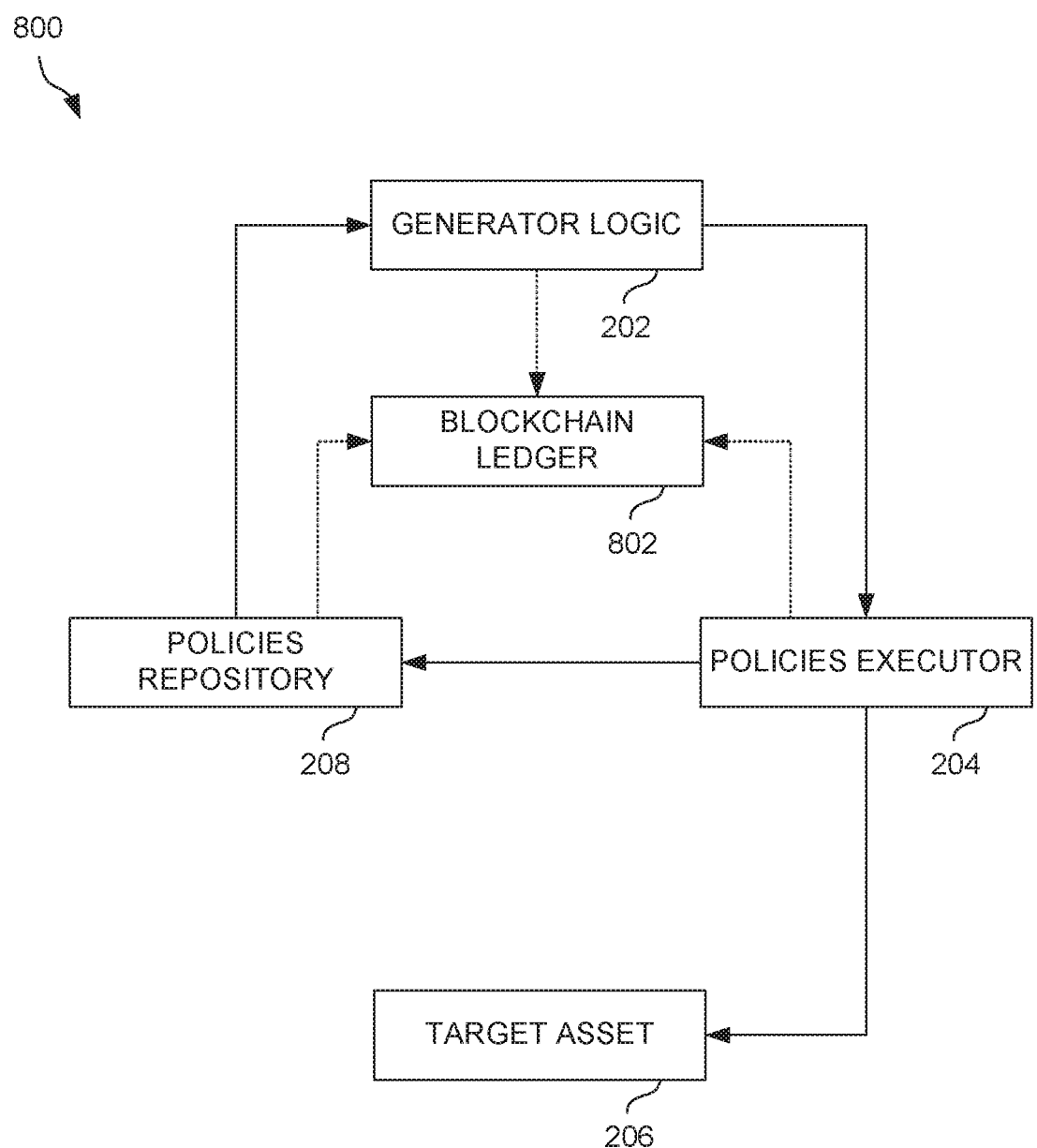
FIG. 8 shows a system flow diagram resulting from splitting and distributing a privileged software component into dependent components in order to deliver better security, in accordance with one embodiment.

FIG. 8 shows a system flow diagram resulting from splitting and distributing a privileged software component into dependent components in order to deliver better security, in accordance with one embodiment. As an option, the flow diagram may be implemented in the context of the details of the previous figures and/or any subsequent figure(s). Of course, however, the flow diagram may be implemented in the context of any desired environment. Further, the aforementioned definitions may equally apply to the description below.

As shown, system 800 may include a blockchain ledger 802. In one embodiment, the blockchain ledger 802 may correspond with the blockchain ledger 402. Additionally, the system 800 may function, in one embodiment, without a credentials vault. Further, the generator logic 202, the policies executor 204, the target asset 206, and the policies repository 208, may function in a manner consistent as herein described.

In one embodiment, the system 800 may include a generator logic 202 that matches a given policy with collected data and decides on actions. A policies executor 204 stores encrypted privileged credentials, which once the encrypted privileged credentials are decrypted, they can be used to execute actions. A policies repository 208 may store policy rules and decryption key(s) for the policies executor's 204 credentials. The blockchain ledger 802 may be used to audit and keep the status of each authentication cycle (the loop from policy creation, detection, execution, etc.).

In one embodiment, the policies repository 208 may provide the generator logic 202 with policy rules. The generator logic 202 may be provided with data or collects data. The generator logic 202 may match provided rules with data.

The generator logic 202 may update the blockchain ledger 802 with relevant confirmation of a matched rule. The generator logic 202 may send a command to the policies executor 204. The command may include a trigger policy rule and relevant data. The policies executor 204 may update the blockchain ledger 802 with a confirmation of any or all of a rule, policy and data from the generator logic 202.

The policies executor 204 may validate trigger policy rule(s) with the policies repository 208. The policies repository 208 may update the blockchain ledger 802 with a confirmation of the policies executor's 204 request. Due to the fact that there is no credentials value shown in FIG. 8, any credentials should come directly from the policies repository 208.

In another embodiment, an attacker may need to gain control of all machines (such as the generator logic 202, the policies executor 204, and/or the policies repository 208) in order to gain privileged access, or the blockchain ledger 802 may report a failure in the chain of command. Each machine can be hardened, analyzed for normal and abnormal behavior, and expose a well-defined API, which can be monitored.

Figure 9:
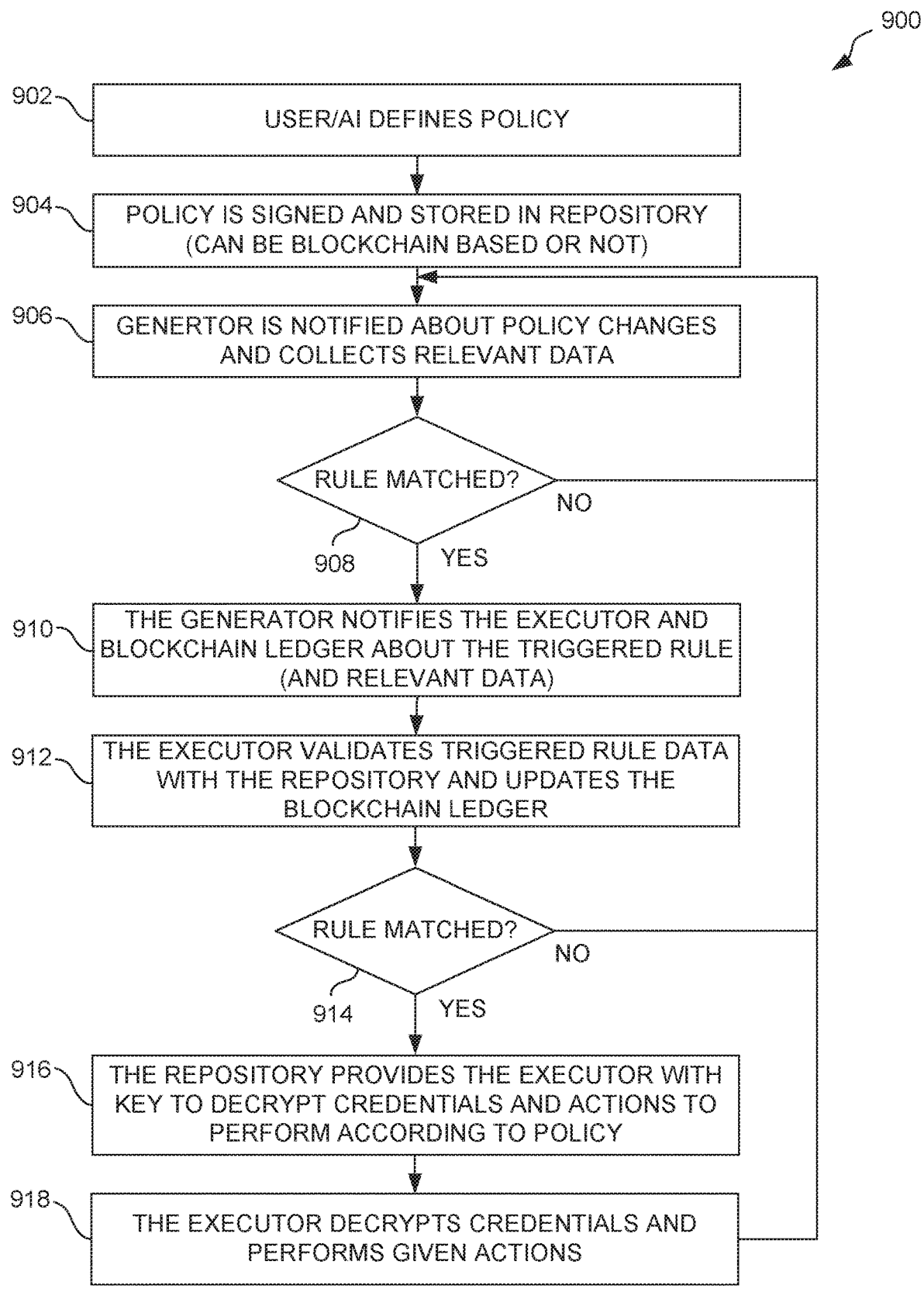
FIG. 9 shows a flow diagram resulting from splitting and distributing a privileged software component into dependent components in order to deliver better security, in accordance with one embodiment.

FIG. 9 shows a flow diagram resulting from splitting and distributing a privileged software component into dependent components in order to deliver better security, in accordance with one embodiment. As an option, the flow diagram may be implemented in the context of the details of the previous figures and/or any subsequent figure(s). Of course, however, the flow diagram may be implemented in the context of any desired environment. Further, the aforementioned definitions may equally apply to the description below.

As shown, per operation 902, a user or an artificial intelligence (AI) system defines a policy. The policy is signed and stored in a repository (can be blockchain based or non-blockchain repository). See operation 904. The generator (such as the generator logic 202) is notified about policy changes and collects relevant data. See operation 906.

It is determined whether the rule matches. See decision 908. If the rule of the policy does not match, the method 900 returns to operation 906. If the rule does match, then the method 900 continues on to operation 910 where the generator logic 202 notifies the policies executor 204 and the blockchain ledger 802 about the triggered rule, as well as any relevant data collected. The policies executor 204 may validate the triggered rule data with the policies repository 208 and update the blockchain ledger 802. See operation 912.

It is determined again whether the rule matches. See decision 914. If the rule of the policy does not match, the method 900 returns to operation 906. If the rule does match, then the method 900 continues on to operation 916 where the policies repository 208 provides the policies executor 204 with a key to decrypt credentials, and actions to perform according to the policy. At operation 918, the policies executor 208 decrypts the credentials and performs the given actions.

Figure 10:
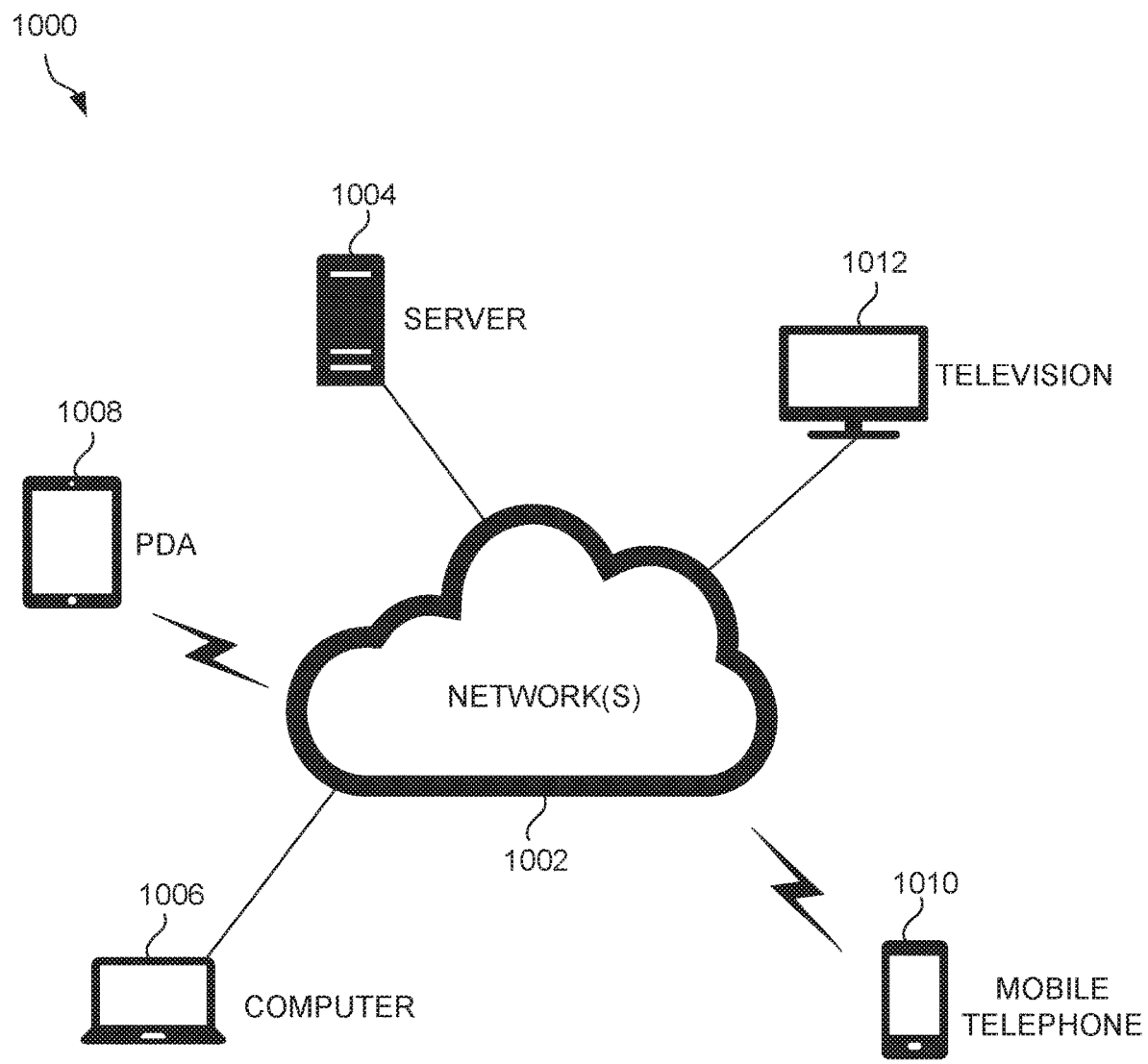
FIG. 10 illustrates a network architecture, in accordance with one possible embodiment.

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1004 and an end user computer 1006 may be coupled to the network 1002 for communication purposes. Such end user computer 1006 may include a desktop computer, lap-top computer, and/or any other type of logic. Still yet, various other devices may be coupled to the network 1002 including a personal digital assistant (PDA) device 1008, a mobile phone device 1010, a television 1012, etc.

Figure 11:
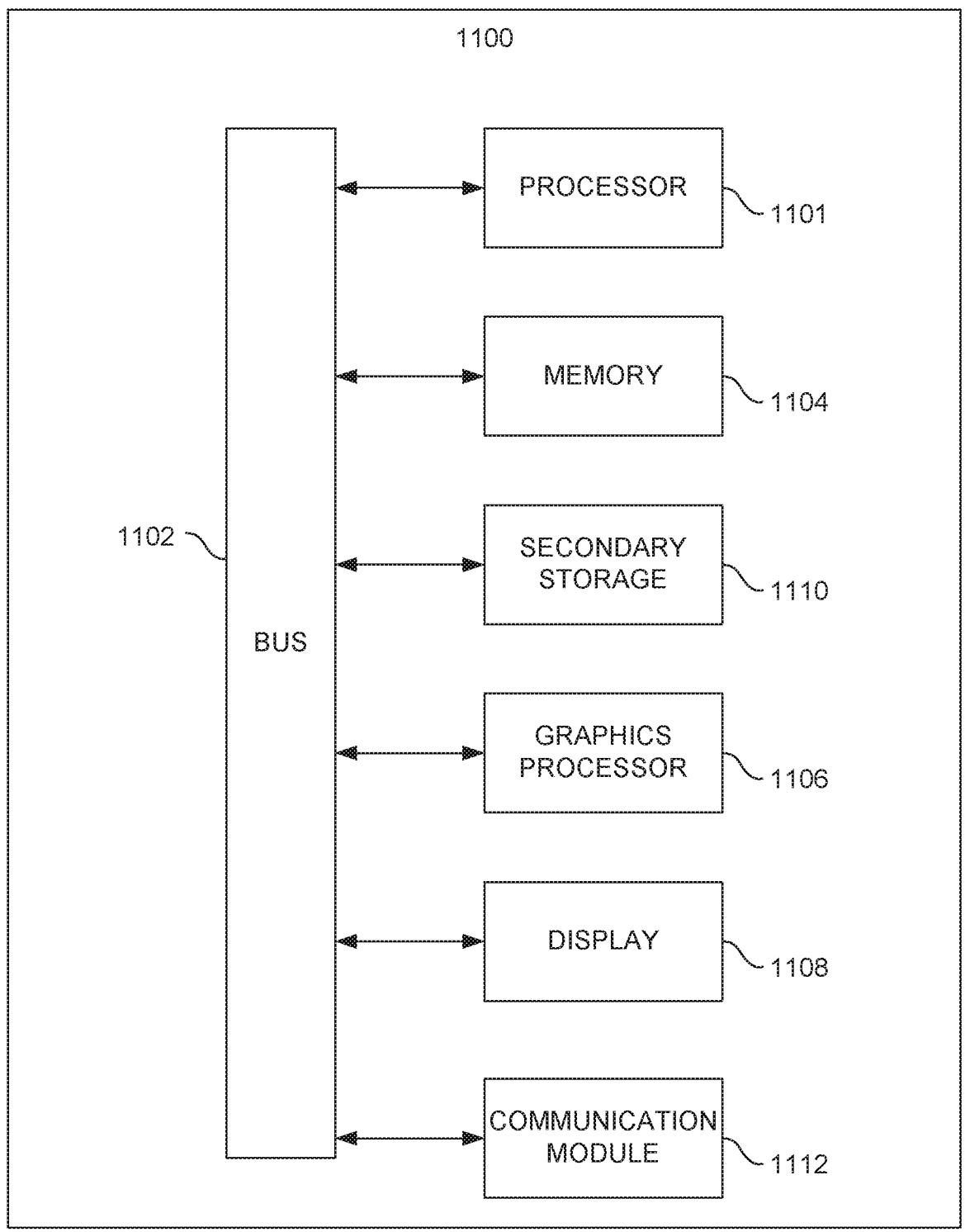
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions (as set forth above, for example). Memory 1104, storage 1110 and/or any other storage are possible examples of non-transitory computer-readable media.

The system 1100 may also include one or more communication modules 1112. The communication module 1112 may be operable to facilitate communication between the system 1100 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising computer executable instructions stored on a non-transitory computer readable medium that when executed by a processor instruct the processor to:
    separate a privilege system into n components, wherein each of the n components is a different system resource that runs on a separate machine and wherein the n components include at least:
    a policies repository component storing a plurality of policy rules,
    generator logic component to determine when the plurality of policy rules are triggered, and
    a policy executor component that executes the policy rules to perform the one or more actions on a target asset;
    distribute a power of a privilege among the n components by delegating authority to perform functions across the n components such that up to n−1 components of the n components may be controlled by an attacker without compromising the privilege system; and
    perform one or more actions within the privileged system using the n components.

2. The computer program product of claim 1, wherein the n components further include a blockchain ledger which is used by any other component of the n components to store and audit the policy rules, to provide further security against tampering of the policy rules, or to provide further security via fault-tolerance.

3. The computer program product of claim 2, wherein the blockchain ledger is used to encrypt the policy rules as well as any data associated with the policy rules, and the blockchain ledger is used by a credential vault to verify that policies repository component, the generator logic component, and the policy executor component are confirmed.

4. The computer program product of claim 1, wherein the n components further include a credential vault which provides the policy executor component with credentials.

5. The computer program product of claim 1, wherein the one or more actions are performed on a target asset, the one or more actions including at least one of spawning a new instance, removing an instance, or restarting a service.

6. The computer program product of claim 1, wherein the policy repository component stores the plurality of policy rules in a blockchain ledger, wherein the generator logic component verifies an integrity of the plurality of policy rules using the blockchain ledger.

7. A method, comprising:
    separating a privilege system into n components, wherein the n components is a different system resource that runs on a separate machine and wherein the n components include at least:
    a policies repository component storing a plurality of policy rules,
    generator logic component to determine when the plurality of policy rules are triggered, and
    a policy executor component that executes the policy rules to perform the one or more actions on a target asset;
    distributing a power of a privilege among the n components by delegating authority to perform functions across the n components such that up to n−1 components of the n components may be controlled by an attacker without compromising the privilege system; and
    performing one or more actions within the privileged system using the n components.

8. A device, comprising:
    a non-transitory memory storing instructions; and
    one or more processors in communication with the non-transitory memory, wherein the one or more processors execute the instructions to:
    separate a privilege system into n components, wherein each of the n components is a different system resource that runs on a separate machine and wherein the n components include at least:
    a policies repository component storing a plurality of policy rules,
    generator logic component to determine when the plurality of policy rules are triggered, and
    a policy executor component that executes the policy rules to perform the one or more actions on a target asset;
    distribute a power of a privilege among the n components by delegating authority to perform functions across the n components such that up to n−1 components of the n components may be controlled by an attacker without compromising the privilege system; and
    perform one or more actions within the privileged system using the n components.

9. The computer program product of claim 1, wherein performing the one or more actions within the privileged system using the n components is based on the distributed power of the privilege among the n components and includes:
    collecting, by the generator logic component, data;
    accessing, by the generator logic component, the policy repository component;
    determining, by the generator logic component, that a policy rule of the plurality of policy rules stored in the policy repository component is triggered, based on the collected data;
    in response to the determining, generating, by the generator logic component, a command to perform an action of the one or more actions, the command including the policy rule of the plurality of policy rules;
    sending, by the generator logic component, the command to the policy executor component; and
    executing, by the policy executor component, the action on a target asset, in response to receipt of the command.

10. The computer program product of claim 9, wherein the policy executor component executes the action by:
    accessing, by the policy executor component, a decryption key stored by the policy repository component;
    decrypting, by the policy executor component, encrypted privileged credentials stored by the policy executor component, using the decryption key to validate the policy rule included in the command; and responsive to validating the policy rule, executing, by the policy executor component, the action on the target asset according to the policy rule.

11. The computer program product of claim 10, wherein the action to perform according to the policy rule is accessed from the policy repository component along with the decryption key.

12. The computer program product of claim 11, wherein the policy executor component receives from the generator logic component the policy rule and the collected data in association with the command, and wherein the policy executor component verifies that the policy rule is triggered by the collected data before executing the action on the target asset.

* * * * *